US012621068B2

(12) United States Patent　　(10) Patent No.:　US 12,621,068 B2

Fischer-Buhner　　(45) Date of Patent:　May 5, 2026

(54) NONLINEAR NEURAL NETWORK WITH PHASE NORMALIZATION FOR BASE-BAND MODELLING OF RADIO-FREQUENCY NON-LINEARITIES

(71) Applicant: Nokia Solutions and Networks Oy, Espoo (FI)

(72) Inventor: Arne Fischer-Buhner, Leuven (BE)

(73) Assignee: Nokia Solutions and Networks Oy, Espoo (FI)

( * ) Notice: Subject to any disclaimer, the term of this patent is extended or adjusted under 35 U.S.C. 154(b) by 40 days.

(21) Appl. No.: 18/617,740

(22) Filed: Mar. 27, 2024

(65) Prior Publication Data

US 2024/0340099 A1　　Oct. 10, 2024

(30) Foreign Application Priority Data

Apr. 4, 2023　(FI) ...................................... 20235382

(51) Int. Cl.
H04B 1/04 (2006.01)
H04B 17/13 (2015.01)
H04B 17/391 (2015.01)

(52) U.S. Cl.
CPC ........... H04B 17/3913 (2015.01); H04B 1/04 (2013.01); H04B 17/13 (2015.01); H04B 2001/0433 (2013.01)

(58) Field of Classification Search
CPC ..... H03F 1/32; H03F 3/68; H03F 3/24; H04B 1/04; H04B 1/62; H04B 7/06;
(Continued)

(56) References Cited

U.S. PATENT DOCUMENTS

| 6,266,517 | B1 | 7/2001 | Fitzpatrick et al. | .......... 455/114 |
| 10,199,993 | B2 * | 2/2019 | Reichl | ..................... H03F 3/195 |

(Continued)

FOREIGN PATENT DOCUMENTS

| EP | | 3985866 A1 | 4/2022 |
| WO | WO 2022/177482 A1 | | 8/2022 |

OTHER PUBLICATIONS

Jiang, C. et al., "Gated Dynamic Neural Network Model for Digital Predistortion of RF Power Amplifiers With Varying Transmission Configurations," IEEE Transactions on Microwave Theory and Techniques, vol. 71, No. 8. Aug. 2023, pp. 3605-3616.
(Continued)

*Primary Examiner* — Shawkat M Ali

(74) *Attorney, Agent, or Firm* — McCarter & English, LLP

(57) ABSTRACT

Various example embodiments relate to mitigation of a non-linearity in a data communication chain. A method may include: obtaining a data communication signal including a plurality of complex-valued input samples; capturing, from the plurality of complex-valued input samples, a current sample and a set of delayed samples; generating a phase-normalized input signal based on normalizing phase of the current sample and the set of delayed samples by a normalization term, wherein the normalization term is common for the current sample and the set of delayed samples; providing the phase-normalized input signal to a neural network configured to mitigate non-linearity of a data communication chain and to output a complex-valued output sample for each of the plurality of complex-valued input samples; and denormalizing phase of the complex-valued output sample by a denormalization term configured to restore phase of the data communication signal.

14 Claims, 6 Drawing Sheets

(58) Field of Classification Search
CPC ...... H04B 7/0456; H04B 17/13; H04B 17/15;
H04B 17/3913; H04L 5/12; H04L 25/03;
H04L 25/49; H04L 27/26; H04L 27/36
USPC ......................... 375/219, 285, 295–297, 316
See application file for complete search history.

(56) References Cited

U.S. PATENT DOCUMENTS

| | | | |
|---|---|---|---|
| 11,133,854 B1* | 9/2021 | Pratt | .................... H04B 7/0639 |
| 2009/0185635 A1 | 7/2009 | Okello | ......................... 375/267 |
| 2021/0111936 A1* | 4/2021 | Sahin | .................... G06N 3/048 |
| 2021/0266203 A1 | 8/2021 | Yoo et al. | |
| 2022/0200540 A1 | 6/2022 | Kof et al. | |
| 2023/0009343 A1* | 1/2023 | Abdelhafiz | .............. H04B 1/10 |
| 2023/0020369 A1 | 1/2023 | Falempin et al. | ................ 1/475 |
| 2025/0030580 A1* | 1/2025 | Behravan | .............. H03F 1/3282 |

OTHER PUBLICATIONS

Fischer-Buhner, A. et al., "Phase-Normalized Neural Network for Linearization of RF Power Amplifiers," IEEE Microwave and Wireless Technology Letters, Jun. 10, 2023.

* cited by examiner phase normalization
respective $x(k)$

NONLINEAR NEURAL NETWORK WITH PHASE NORMALIZATION FOR BASE-BAND MODELLING OF RADIO-FREQUENCY NON-LINEARITIES

TECHNICAL FIELD

Various example embodiments relate to mitigation of a non-linearity in a data communication chain. Some example embodiments relate to phase-normalization of an input signal for a neural network configured to mitigate the non-linearity.

BACKGROUND

Power-efficient transmission in any modern data communication chain is of key importance. Various circuit components may cause a number of non-linearity related problems. A non-linear digital model may be applied to mitigate such non-linearities in these circuit elements. A general requirement for these non-linear digital models is high modelling capability at low complexity and therefore neural networks (NN) may be considered for this purpose.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments of the present disclosure improve performance of mitigating non-linearity of a data communication chain. This and other benefits may be achieved by the features of the independent claims. Further example embodiments are provided in the dependent claims, the description, and the drawings.

According to a first aspect, a method is disclosed. The method may comprise: obtaining a data communication signal comprising a plurality of complex-valued input samples; capturing, from the plurality of complex-valued input samples, a current sample and a set of delayed samples; generating a phase-normalized input signal based on normalizing phase of the current sample and the set of delayed samples by a normalization term, wherein the normalization term is common for the current sample and the set of delayed samples; providing the phase-normalized input signal to a neural network configured to mitigate non-linearity of a data communication chain and to output a complex-valued output sample for each of the plurality of complex-valued input samples; and denormalizing phase of the complex-valued output sample by a denormalization term configured to restore phase of the data communication signal.

According to an example embodiment of the first aspect, the neural network is a real-valued neural network.

According to an example embodiment of the first aspect, the normalization term may be configured to normalize each current sample of the plurality of complex-valued input samples to zero-phase.

According to an example embodiment of the first aspect, each sample of the phase-normalized input signal is decomposed into two real-valued samples, wherein the two real-valued samples represent real and imaginary parts of the current sample or a delayed sample.

According to an example embodiment of the first aspect, the normalization may be based on multiplication of the current sample and the delayed samples by the normalization term, and the denormalization may be based on multiplication of the complex-valued output sample by the denormalization term. The denormalization term may comprise a complex conjugate of the normalization term.

According to an example embodiment of the first aspect, the method may further comprise providing, to the neural network an augmented input, comprising a second set of delayed samples comprising a p-th power of an absolute value of the delayed samples, where p is a non-zero integer.

According to an example embodiment of the first aspect, the neural network may be further configured to mitigate non-linearity of a radio frequency part of the data communication chain.

According to an example embodiment of the first aspect, the method may further comprise providing the data communication signal to a linear dynamic model configured to mitigate the non-linearity of the data communication chain parallel to the neural network.

According to an example embodiment of the first aspect, the method may further comprise providing the data communication signal to a non-linear dynamic model configured to mitigate the non-linearity of the data communication chain parallel to the neural network.

According to an example embodiment of the first aspect, the neural network may be further configured to mitigate a non-linearity of a radio frequency amplifier.

According to an example embodiment of the first aspect, the radio frequency amplifier may comprise a power amplifier.

According to an example embodiment of the first aspect, the data communication signal may comprise a baseband signal.

According to an example embodiment of the first aspect, the method is performed by a transmitter, a receiver, a transceiver, a user equipment, or an access node.

According to a second aspect, an apparatus is disclosed. The apparatus may comprise at least one processor; and at least one memory storing instructions that, when executed by the at least one processor, cause the apparatus at least to: obtaining a data communication signal comprising a plurality of complex-valued input samples; capturing, from the plurality of complex-valued input samples, a current sample and a set of delayed samples; generating a phase-normalized input signal based on normalizing phase of the current sample and the set of delayed samples by a normalization term, wherein the normalization term is common for the current sample and the set of delayed samples; providing the phase-normalized input signal to a neural network configured to mitigate non-linearity of a data communication chain and to output a complex-valued output sample for each of the plurality of complex-valued input samples; and denormalizing phase of the complex-valued output sample by a denormalization term configured to restore phase of the data communication signal. The instructions may be further configured to, when executed by the at least one processor, cause the apparatus to perform any example embodiment of the first aspect.

According to a third aspect, an apparatus is disclosed. The apparatus may comprise means for obtaining a data communication signal comprising a plurality of complex-valued input samples; means for capturing, from the plurality of complex-valued input samples, a current sample and a set of delayed samples; means for generating a phase-normalized input signal based on normalizing phase of the current sample and the set of delayed samples by a normalization term, wherein the normalization term is common for the current sample and the set of delayed samples; means for providing the phase-normalized input signal to a neural network configured to mitigate non-linearity of a data communication chain and to output a complex-valued output sample for each of the plurality of complex-valued input samples; and means for denormalizing phase of the complex-valued output sample by a denormalization term configured to restore phase of the data communication signal. The apparatus may comprise means for performing any example embodiment of the method of the first aspect.

According to a fourth aspect, an apparatus is disclosed. The apparatus may comprise: delay circuitry configured to obtain a data communication signal comprising a plurality of complex-valued input samples and to capture, from the plurality of complex-valued input samples, a current sample and a set of delayed samples; phase normalization circuitry configured to generate a phase-normalized input signal based on normalizing phase of the current sample and the set of delayed samples by a normalization term, wherein the normalization term is common for the current sample and the set of delayed samples and to provide the phase-normalized input signal to neural network circuitry configured to mitigate non-linearity of a data communication chain and to output a complex-valued output sample for each of the plurality of complex-valued input samples; and denormalization circuitry configured to denormalize phase of the complex-valued output sample by a denormalization term configured to restore phase of the data communication signal. The delay circuitry, phase-normalization circuitry, neural network circuitry, and/or denormalization circuitry may be further configured to perform any example embodiment of the method of the first aspect. According to an example embodiment of the second, third, or fourth aspect, the apparatus may be implemented in a transmitter, a receiver, a transceiver, a user equipment, or an access node.

According to a fifth aspect, a (non-transitory) computer readable medium is disclosed. The (non-transitory) computer readable medium may comprise program instructions that, when executed by an apparatus, cause the apparatus to perform a method according to the first aspects, or any example embodiment thereof.

Example embodiments of the present disclosure can thus provide apparatuses, methods, computer programs, computer program products, or computer readable media for enabling a handover or cell switch with short delay. Any example embodiment may be combined with one or more other example embodiments. These and other aspects of the present disclosure will be apparent from the example embodiment(s) described below. According to some aspects, there is provided the subject matter of the independent claims. Some further aspects are defined in the dependent claims.

DESCRIPTION OF THE DRAWINGS

The accompanying drawings, which are included to provide a further understanding of the example embodiments and constitute a part of this specification, illustrate example embodiments and, together with the description, help to explain the example embodiments. In the drawings.

Like references are used to designate like parts in the accompanying drawings.

DETAILED DESCRIPTION

Figure 1:
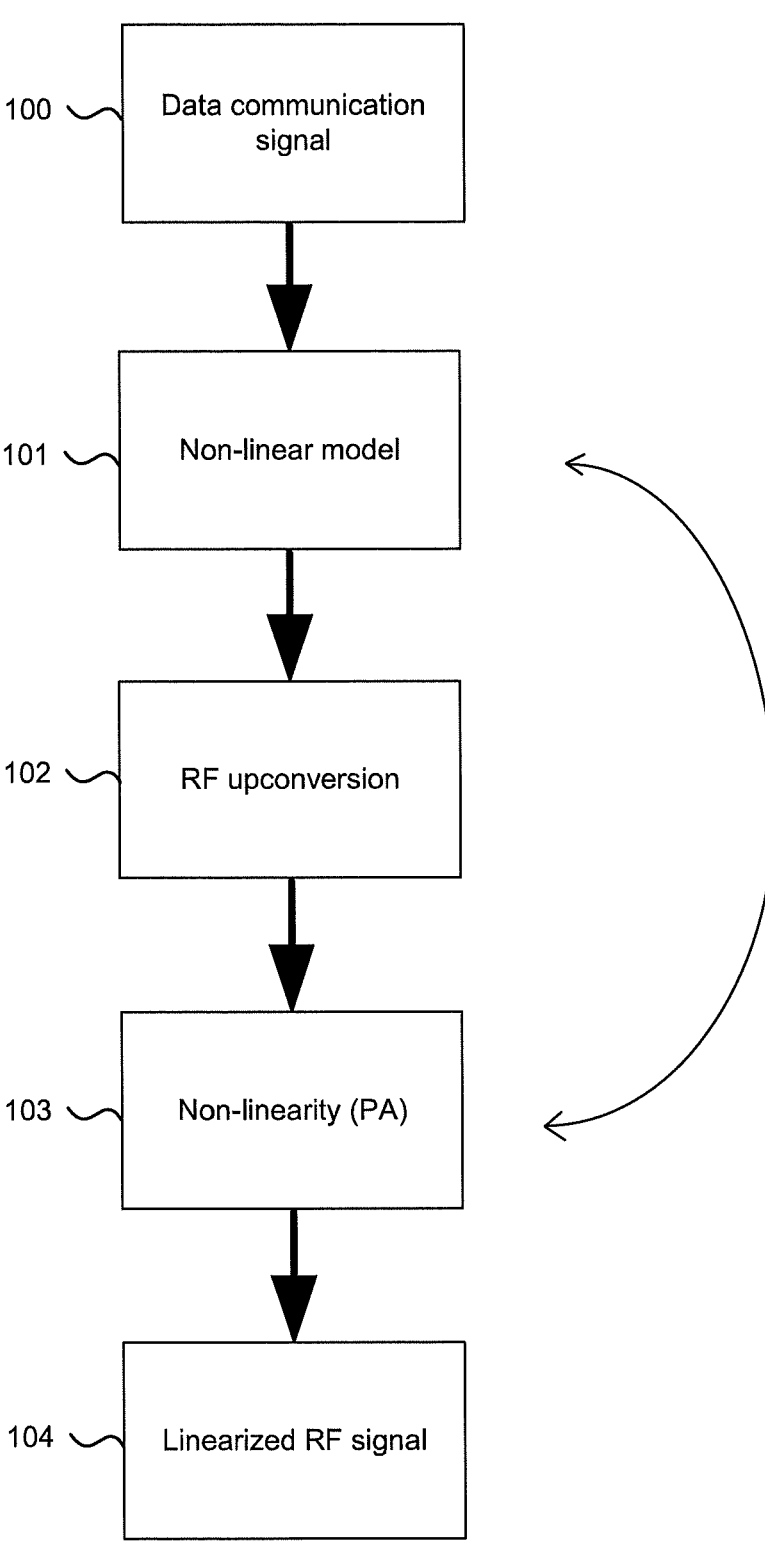
FIG. 1 illustrates an example of a data communication chain.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Modern communication systems may suffer from various non-linearities, for example in transmission or reception of communication signals. Non-linearity may cause the signal power of a bandlimited communication signal to spread outside its defined bandwidth, leading to, e.g., interference to adjacent communication channels, carriers, or signals. Non-linearities may also dynamically distort the desired signal to the extent that it is no longer possible to correctly decode the signal. Power efficient transmission is one target for any modern wireless communication system. Therein, the power amplifier may contribute to transmit power consumption as it suffers from a trade-off between amplification linearity and power efficiency. Various techniques may be applied to mitigate the afore-mentioned problem such as digital predistortion (DPD). DPD may be applied in the digital frontend/radio unit to mitigate non-linearities as well as dynamic distortion due to amplification, therefore opening the possibility to higher transmission power and greater efficiency.

Low complexity may be desired for techniques for mitigating non-linearities, for example because low complexity is generally associated with low power consumption and less required circuit components. Neural networks (NNs) may be considered in such technique due to their excellent non-linear mapping capabilities, for example with wide-band signals or in the context of beamforming/MIMO transmitters. While NN models offer high modelling accuracy, their computational complexity may be relatively high, for example in training and/or inference phase.

Various example embodiments of the present disclosure consider neural network utilization for mitigating non-linearities in any communication chain. A phase-normalization technique for a complex-valued input signal is considered, where a normalization term is utilized on the input side of the NN, and a denormalization term is utilized on the output side of the NN. In several examples, quadrature amplitude modulated (QAM) input signal is being considered with the in-phase signal (I-signal) and quadrature-phase signal (Q-signal) being represented with the real and imaginary part of the complex-valued input signal. For the purposes of clarity, the I-signal may be generally illustrated as the real part and the Q-signal may be presented as the imaginary part. QAM is however merely provided as an example of a modulation scheme and in general the example embodiments may be applied to any modulation schemes with complex-valued constellation symbols, such as for example phase-shift keying (PSK), optimally in combination with multicarrier techniques, such as for example orthogonal frequency division multiplexing (OFDM).

FIG. 1 illustrates an example block diagram of a data communication chain. In this example, the data communication chain comprises a RF transmitter chain. At 100, a data communication signal, which may be an analog or a digital baseband signal such as QAM, frequency modulated (FM) or amplitude modulated (AM) signal, may be sent to be converted to a higher frequency at RF up-conversion block 102. At 103, a non-linearity, for example generated by a power amplifier, PA, may distort the data communication signal in a way that needs to be mitigated. The non-linearity may be due to power and/or efficiency constraints set on the PA on the design phase of the example system of FIG. 1. A non-linear model 101 may be provided at the data communication chain, for example before the RF up-conversion block 102 if the transfer function of the PA is mapped to the baseband signal. In an example, the non-linear model 101 may be set to have an inverse dynamic response curve (input power against output power) to the PA. For example, in an analog system, the baseband down-converted PA dynamic response may be mapped for a pre-amplifier in order to act against the non-linearity of the PA. The target outcome of this example is a linearized RF signal 104, which may then be provided to further stage(s) of the data communication chain, e.g., an antenna. For the purposes of clarity, the data communication chain may comprise further components, such as the antenna and/or impedance matching components not depicted in FIG. 1. A baseband signal may comprise a signal whose frequency content is concentrated near zero-frequency.

In an example implementation, the example system in FIG. 1 is a digital QAM transmitter system, where the data communication signal 100 is a complex-valued digital signal, where the I-signal is the real part of the data communication signal 100 and the Q-signal is the imaginary part of the data communication signal 100. The non-linear model 101 considered is a neural network, configured to mitigate the non-linearities of the non-linearity block 103. During RF up-conversion, the absolute component of a complex baseband signal sample, x(k) is mapped to the RF envelope, while the derivative of the baseband phase modulates the frequency of the transmitted waveform. Consequently, the specific baseband phase of the signals is not seen by a non-linear RF device, therefore including the non-linearities of the RF up-conversion block 102 may be left out in this example.

Figure 2:
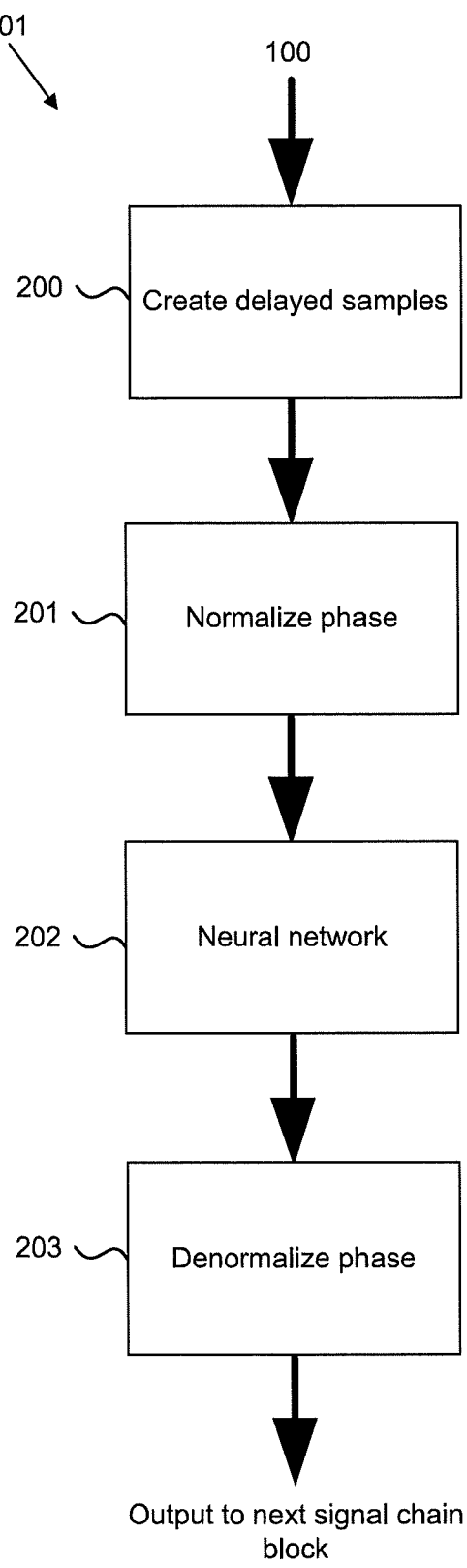
FIG. 2 illustrates an example of method for mitigating non-linearity of a data communication chain.

FIG. 2 illustrates an example implementation of the non-linear model 101. The data communication signal 100 may comprise a plurality of complex-valued input samples. The samples of the data communication signal may be obtained by receiving them from a previous block or function of the data communication chain, for example a modulator configured to modulate a signal generated by, for example, a QAM mapper configured to map groups of bits to complex-valued modulation symbols (in case of a data transmission chain). The samples of the data communication signal 100 may be alternatively obtained by receiving them from an equalizer configured to equalize received complex-valued modulation symbols (in case of a data reception chain).

At 200, a current sample and a set of delayed samples are captured from the data communication signal 100. The size of the set of delayed samples may affect performance and efficiency of mitigating the non-linearity, as the larger the set of delayed samples is, the more complex the calculations may be.

At 201, a phase-normalized input signal may be generated based on normalizing phase of the current sample and the set of delayed samples by a normalization term. The normalization term may be common for the current sample and the set of delayed samples. Normalizing the phase may comprise rotating the complex-valued input sample by a chosen amount in the Real-Imaginary plane. Values in the set of delayed samples may be then rotated by the same amount. Phase normalization may be performed for a current sample and a respective set of delayed samples at a time. At a subsequent time, a subsequent (e.g., next) sample may be selected as the current sample, and another set of delayed samples may be captured (e.g., the set of delayed samples may be updated with a new sample). The phase normalization term may be common to the current sample and the set of delayed samples, but the phase normalization term may be different at different time instants, e.g., when performing the phase normalization for different samples as the current sample.

The phase-normalized input signal is then, at 202, provided to a neural network configured to mitigate non-linearity of the data communication chain. The neural network may be configured to output a complex-valued output sample for each of the plurality of complex-valued input samples. Neural network 202 may be therefore configured to generate one output sample for one input sample. Since neural network 202 comprises a known amount of layers, the delay caused by neural network 202 is known. The system may therefore determine which output sample of neural network 202 corresponds to which (current) sample of the communication signal.

For training the NN model, training data may be applied, respective to the usage scenario. The training data may comprise measured I/Q baseband data of an analog RF transmitter, measured offline, or online with help of a dedicated feedback receiver in a transmitter. The model, or parts of the model, may be retrained/fine-tuned in order to improve the accuracy, or adapt the model to a new behavior as examples of the present disclosure herein may be executed purely digitally. During training the coefficients in the hidden layers are modified, e.g. using backpropagation algorithm, such that a loss function is optimized, e.g. minimizing the mean-squared error (MSE) of the model prediction compared to ground-truth data. Ground-truth data may be derived using an offline iterative learning control scheme, where an input base-band signal is iteratively optimized to generate a desired output of the non-linearity. This optimized input signal may be then used in conjunction with the desired output to train the model as a mapping between the desired signal and the optimized input. A digital pre-distortion model may be iteratively adapted using an indirect learning approach, where a post-distorter is trained as an output-to-input mapping for measured input-output data. Another approach to update the model is closed-loop learning, where the difference of the output of the non-linearity 103 and the desired output is used to derive gradients to update the model coefficients. Training of non-linear model 101 may therefore comprise propagating input data through the model, receiving an output/prediction form the model, and comparing the prediction with the desired output, e.g., by mean (prediction–desired)$^2$. This error measure (loss function) may be then used to derive gradients using back-propagation to update the coefficients of the model. The phase normalization, the time-delay layer and output layer may not contain any trainable coefficients.

At 203, the example non-linear model 101 denormalizes phase of the complex-valued output sample by a denormalization term configured to restore phase of the data communication signal. Denormalizing the phase of the complex-valued output sample may comprise rotating the phase by a chosen amount, for example the inverse amount of the normalization term. The denormalization term may be configured to cause an inverse phase rotation compared to phase normalization of the corresponding current sample of the data communication signal.

In an example, the neural network at 202 may comprise a real-valued neural network, RVNN. In such case, the input may be decomposed into real values at some point before the neural network. In an example implementation, the decomposition is executed after normalizing the current input sample and the set of delayed samples, for example as will be described with reference to FIG. 5. The decomposition may be executed on the phase-normalized input signal of neural network 202. It is however understood that since complex-valued number may be represented two real-valued amplitudes, the decomposition may be done at any suitable location at the data communication chain. In some example embodiments, a complex-valued (baseband) sample may be represented by its amplitude and phase, instead of its real and imaginary parts.

Figure 3:
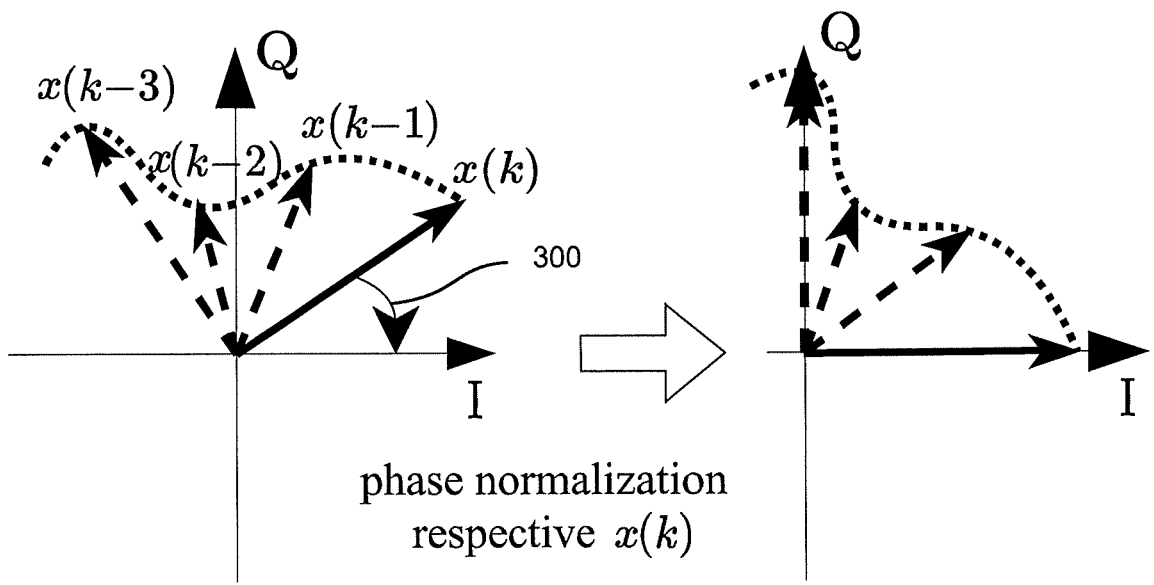
FIG. 3 illustrates a complex-valued IQ-coordinate plane, wherein a set of complex-valued vectors are rotated with a common normalization term.

FIG. 3 illustrates an example of phase normalization, where the current sample x(k) and a set of delayed samples x(k-M) (where M=[1,3]), are rotated 300 in the complex I-Q plane, so that the current sample x(k) is rotated to the real-axis (I) (zero phase). The set of delayed samples are then rotated with the same normalization term, thus each complex vector rotating the same amount counterclockwise. The rotational angle 300 illustrated in FIG. 3 may be any angle chosen, as the functionality of the example implementation is not limited to this specific angle. It is for example possible to select an amount of rotation that does not result in the current sample being rotated to the real axis (I).

In an example implementation, the normalization term comprises a normalization factor. In another example implementation of the previously described form, the complex-plane rotation may be executed by a multiplication of each current sample and the set of delayed samples by the normalization factor. The normalization factor r(k) may be, for example as in Equation 1.

$$r(k) = \frac{x^*(k)}{|x(k)|} \qquad (1)$$

In Eq. 1, the nominator of the right side is the complex conjugate of the current input sample x(k), and the denominator is the absolute value of the current sample. In general, the normalization factor may comprise the complex conjugate of the current sample x*(k). Amplitude of the normalization factor may be scaled with a suitable value (e.g., |x(k)|) or it may not be scaled at all. In an example, the denormalization term may comprise a denormalization factor. Therefore, the phase of the complex-valued output signal (sample) of the NN may then be denormalized by a multiplication operation with the denormalization factor. The denormalization factor may comprise the complex conjugate of the normalization factor. This causes the effect of phase normalization applied before neural network 202 to be removed from the output samples of neural network 202.

Figure 4:
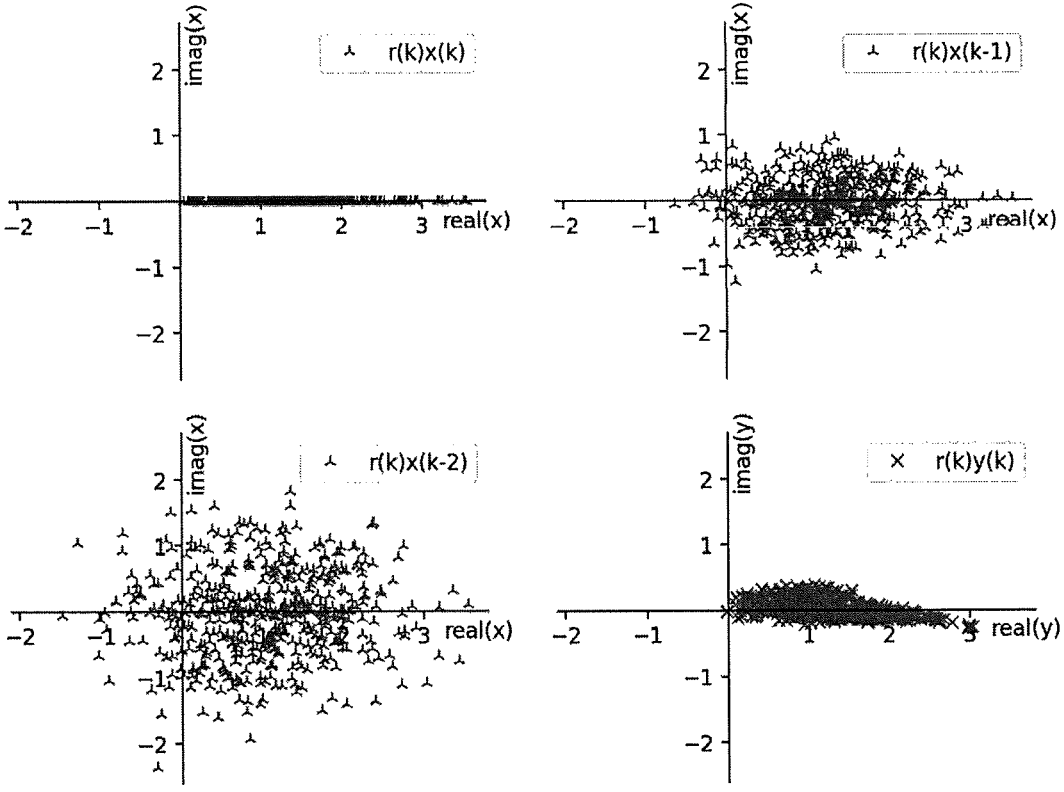
FIG. 4 illustrates examples of current samples and delayed samples subsequent to phase normalization and correspondingly phase rotated output samples.

FIG. 4 illustrates examples of phase normalized current samples (r(k)x(k)) and delayed samples (r(k)x(k-1), r(k)x(k-2)) and correspondingly phase rotated output samples (r(k) y(k)). This figure shows an example of how the normalization term and the denormalization term may affect a plurality of sample sets on the complex-plane. The simulated results given are simulated with an input vector length of N=1000. At the upper-left, the current sample x(k) is rotated to the real-axis with a multiplication operation with the normalization term r(k). At upper-right, the previous sample from the current sample (x(k-1)) is rotated with r(k) multiplication and at lower-left, the secondly previous sample (x(k-1)) is rotated with r(k) multiplication. Finally at lower-right, a complex-valued and denormalized output signal y(k) (e.g., the output of neural network 202 multiplied by the denormalization term r*(k)) is rotated again with the phase normalization term r(k) of the corresponding current sample x(k) to illustrate the output of neural network 202 before the phase denormalization to illustrate how neural network 202 applies a non-linearity to the input signal. If neural network 202 would change the signal, the lower-right figure would yield the same results as the upper-left figure. The effect of non-linearity mitigation may be therefore observed by the spreading of the output samples of neural network 202 around the real axis.

The method disclosed may be used in the context of PA behavioral modeling and PA linearization with digital pre-distortion (DPD), and the results within are simulated with a NN trained for such function. However, the disclosed method may be used in the context of phased array transmitters with beamforming producing load-modulation non-linearities, MIMO transmitters producing crosstalk non-linearities, or multi-band linearization scenarios. The disclosed method may be modified for self-interference cancellation in a full-duplex system, digital post distortion (DPoD) or DPD in other domain, such as linearizing non-linear modulators in optical transmitters. Further, it may be applied to perform PAPR/crest-factor (Peak-to-Average Power Ratio) reduction. For any modification of the disclosed method, the neural network should be trained accordingly.

In phased-array systems, the non-linearity 103 may still be a power amplifier, followed by a phase-delay structure which splits the signal into multiple paths and applies a delay individual to each path. The phase-delay structure may be followed by an antenna array with one antenna for each path. This setup may be generally used to perform beamforming, where the beam direction is configured using the phase-delay structure, by providing specific delay to some antenna transmit paths. By altering the beam direction, e.g., for beam steering, the delays of the transmit paths are altered and the antenna may be driven differently. This results in load modulation, as in the impedance seen by the PA is not constant. While neural network 202 may be trained only using PA input/output training data, in the case of phased-array system, the beam angle may be provided to neural network 202 as input. In addition, the load impedance behavior of the PA may be applied to the training data, e.g., in the case of very high load impedance, the PA may be driven with a higher power signal and in the case of low load impedance, the PA may be driven with a lower power signal.

In MIMO systems (multiple input/multiple output), several input signals and several output signals are passed into several transmit paths, with one PA per path. Additionally, the signals may leak from a transmit path into an adjacent path (crosstalk), which may affect the PA behavior of each path. Additionally, load modulation may occur as in the phase-array case. Neural network 202 acting as a DPD model may be trained to model the behavior of all the PA's, or a subset of the PA's for signals individually or jointly, or solely model the interaction between the paths.

In a multi-band system, a power amplifier may be used to amplify two or more signals which are located at different center frequencies at the same time. Thus, a baseband NN model may be configured to predistort two or more signals which then jointly encounter non-linearity at radio frequencies. Phase normalization may be applied as per that context, regarding the current sample of one of the multiple signals.

The phase normalization technique may be used in the context of self-interference cancellation (e.g., full-duplex radios). Neural network 202 may be trained to predict and cancel the undesired non-linear self-interference leaking from the transmitter (Tx) to the receiver (Rx) path.

In the context of digital postdistortion modelling (DPoD), non-linear model 101 may be placed on the receiver side. DPoD may be used in conjunction with DPD model.

In the context of PAPR/crest reduction, non-linear model 101 may be trained to introduce a non-linearity to the signal in order to reduce the amplitude of the RF signal. Possible impact of amplitude reduction on the transmit bits should be covered carefully.

Figure 5:
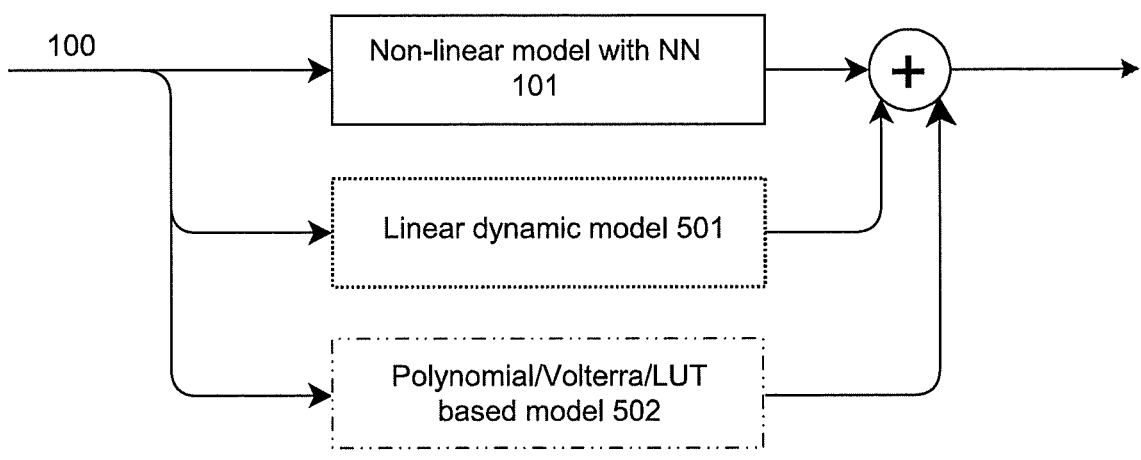
FIG. 5 illustrates an example of a block diagram for mitigating non-linearity of a data communication chain with parallel models.

In additional examples, as illustrated in FIG. 5, the non-linear model 101 with neural network 202 may be used in parallel with one or more other models, for example non-machine learning models, using the same data communication signal 100 as their inputs. The non-linear model 101 may be used in conjunction with a linear dynamic model 501 such as a finite impulse response (FIR) filter or a non-linear dynamic model such as polynomial, Volterra-series, or look-up-table (LUT) based model 502. Outputs of models 101, 501, and/or 502 may be combined (e.g., averaged) to provide an output signal to further stage(s) of the data communication chain.

Figure 6:
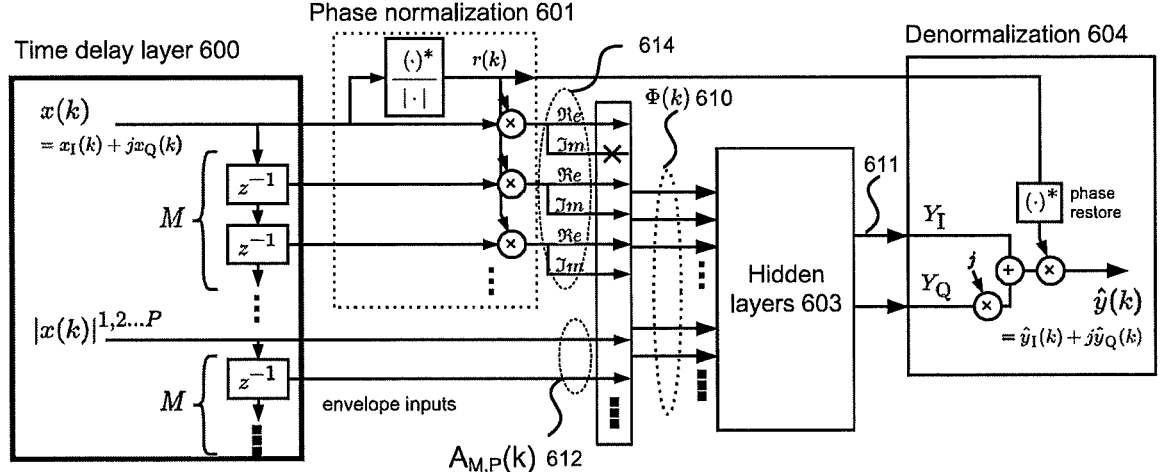
FIG. 6 illustrates a block diagram of an apparatus for mitigating non-linearity of a data communication chain.

FIG. 6 illustrates an example of a block diagram of an apparatus for implementing method(s) described herein. In the time delay layer 600 the current sample and the set of delayed samples are captured, e.g., in a complex-valued buffer to be processed. As illustrated in FIG. 6, time delay layer 600 may be implemented by delay circuitry, which may comprise a buffer configured to (temporarily) store the set of delayed samples. The buffer is illustrated with M delay elements $z^{-1}$.

At phase normalization 601, the complex conjugate of the current sample x(k) may be used to generate the normalization term r(k). The complex conjugate of the current sample x(k) may be divided by the absolute value of sample x(k) to generate the normalization term r(k). As illustrated in FIG. 6, phase normalization layer 600 may be implemented by phase normalization circuitry, which may comprise a set of multipliers configured to multiply a respective delayed sample with the phase normalization factor r(k) to generate phase-normalized input samples for neural network 202, in this example hidden layers 603.

As described above, each of the phase-normalized input samples x(k)*r(k) to x(k-M)*r(k) (where M is a positive integer) may be decomposed into two real-valued samples 614 and then provided to the hidden layers 603 of the neural network at 610. However, complex-valued hidden layers may be used and in this case the input to hidden layers 603 may be also complex-valued. In an example implementation illustrated in FIG. 6, the hidden layers 603 comprise two outputs at 611, one for the in-phase output ($Y_I$) and one for the quadrature phase output ($Y_Q$). The second output is then multiplied with the imaginary number j, or in general the two real valued outputs are interpreted as a complex number. Hidden layers 603, or neural network 202, may be implemented by neural network circuitry, for example circuitry configured to perform calculations associated with nodes (neurons) of hidden layers 603.

The phase is denormalized at 604 by the denormalization term. Phase normalization 604 may be implemented with phase normalization circuitry, which may comprise circuitry for rotating the phase of the output samples of hidden layers 603. For example, the denormalization circuitry may comprise a (complex) multiplier configured to multiply the (complex) output sample of hidden layers 603 with the denormalization factor (e.g. r*(k)). The denormalization term may be configured to cause an inverse phase rotation compared to the normalization term applied for corresponding current sample. For example, if normalization of the current sample comprises rotation by 35 degrees, denormalization may comprise rotation by −35 degrees. Denormalization may therefore comprise rotating the output sample by the same amount as the corresponding current sample, but at the opposite direction.

Even if functionality of time delay layer 600, phase normalization 601, hidden layers 603 (or neural network 202), and/or phase denormalization 604 may be implemented with particular circuitry(ies), e.g., an integrated (baseband) circuit, it is noted that similar functionality/architecture may be implemented with generic processing functions, such as for example at least one processor, at least one memory, and a computer program configured to cause an apparatus to perform functionality of time delay layer 600, phase normalization 601, hidden layers 603 (or neural network 202), and/or phase denormalization 604.

Referring to FIG. 6, an example may comprise augmented inputs ($A_{M,P}(k)$) at 612 to increase the performance of the method. The absolute value x(k) may be raised to any integer power P, as illustrated in the vector equation 2. The augmented inputs therefore reflect the envelope of the data communication signal. In addition, a second set of delayed samples for the augmented inputs may be captured using the same integer M, however any integer may be chosen for the second set of delayed samples.

$$A_{M,P} = \left[ |x(k)|^1, |x(k-1)|^1, \ldots, |x(k-M)|^1, |x(k)|^2, \right. \tag{2}$$

$$\left. |x(k-1)|^2, \ldots |x(k-M)|^2, |x(k)|^P, \ldots, |x(k-M)|^P \right]$$

In an example implementation, the neural network is configured to mitigate non-linearity of a radio frequency part of the data communication chain. For example, the neural network may be provided after the RF upconversion block 102. In addition, the method may be configured to mitigate any radio frequency or baseband amplifier, or even an analog-to-digital converter, if such is required in the system.

Figure 7:
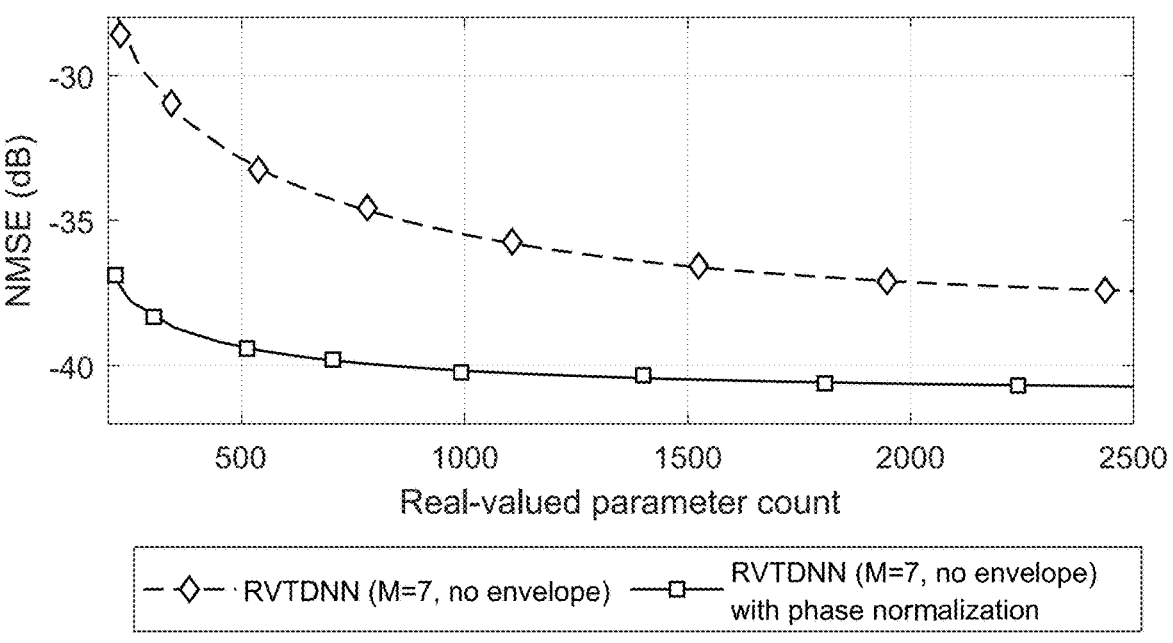
FIG. 7 illustrates a simulated normalized mean square error (NMSE) result with an example embodiment.

FIG. 7 is a simulated performance graph using a NN configured for power amplifier non-linearity mitigation. The graph in FIG. 7 compares the effect of the phase normalization technique disclosed herein against a system, where no phase normalization is used. The performance is measured using normalized mean square error (NMSE, y-axis) against complexity of the model, expressed as a real-valued parameter count, RVCP, corresponding to the number of nodes in neural network 202 (hidden layers 603). Input configuration is same for all points in the plot. The overall performance at high parameter count (e.g., RVCP=2500) is approaching −37.5 dB without phase normalization and towards −40.5 dB with phase normalization, yielding a NMSE differential of −3 dB. The performance gain is, however, larger when a lower complexity model is used. At low complexity, with RVCP=500, the differential between the measured curves is around −5 dB, thus giving a significant performance increase when using 7 delayed inputs (M=7).

Figure 8:
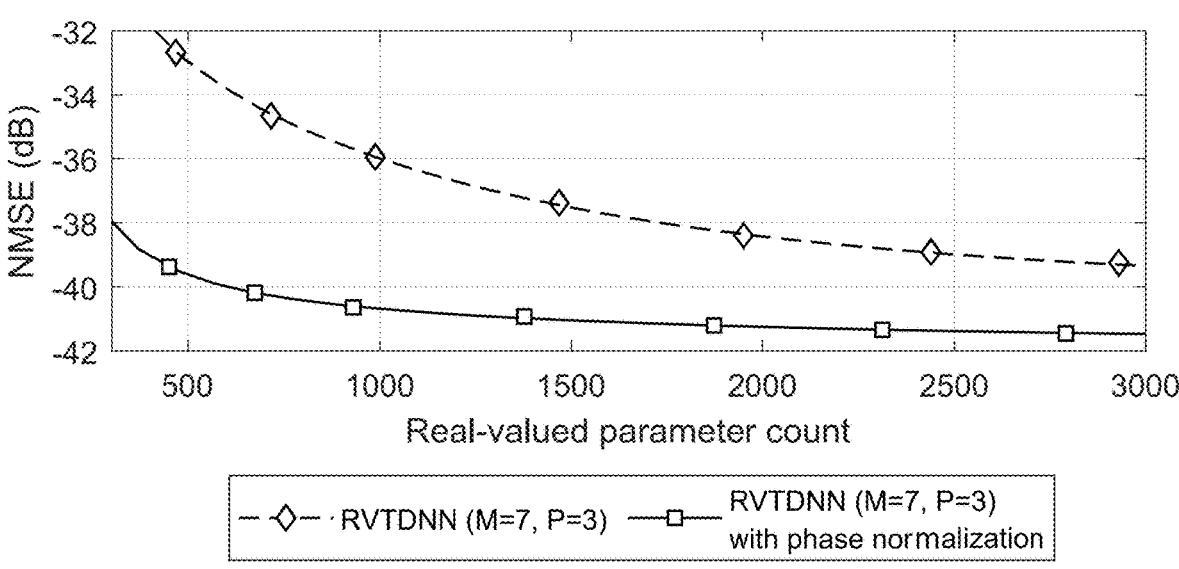
FIG. 8 illustrates an additional simulated normalized mean square error (NMSE) result with an example embodiment.

FIG. 8 is a simulated performance graph using augmented inputs with 7 delayed values both for signal input x(k) and for augmented input $A_{M,P}(k)$. P chosen for this simulation is 3. At high neural network complexity (e.g. RVCP=3000), the results without phase normalization technique is approximately −39 dB and the result with phase normalization is approximately −41.5 dB. At low complexity, with RVCP=500, the result without phase normalization is approximately −32.5 dB and the result with phase normalization is approximately −39.5 dB, yielding a significant NMSE differential of −7 dB. When low complexity NN-based non-linearization is desired, the phase normalization may be used to improve the performance of the data communication chain.

Figure 9:
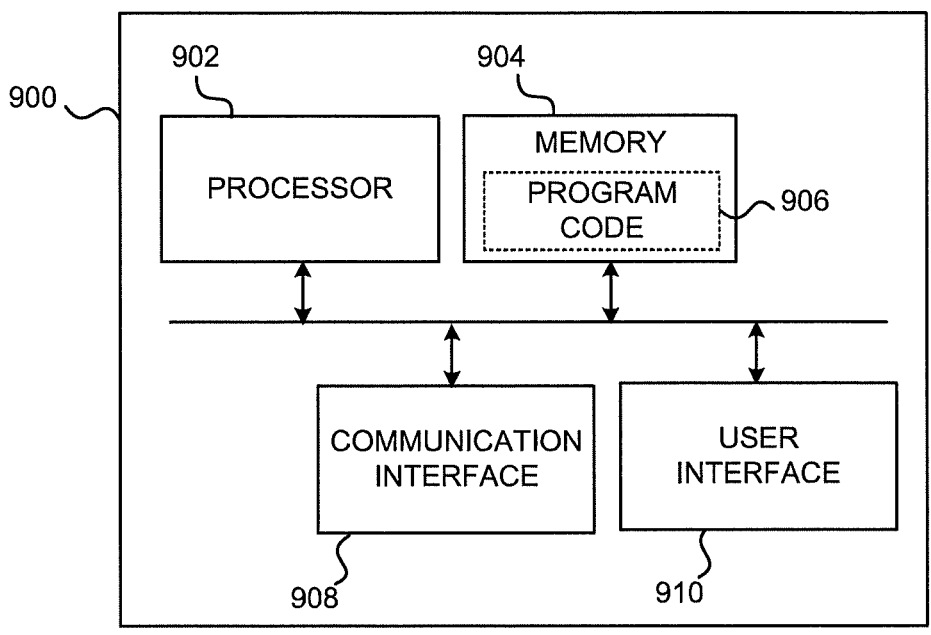
FIG. 9 illustrates an example of an apparatus configured to practice one or more example embodiments.

FIG. 9 illustrates an example of an apparatus 900 configured to practice one or more example embodiments. Apparatus 900 may comprise a device such as for example a user equipment, an access node, an access point, a base station, a radio network node, or a split portion thereof, or in general a device configured to implement functionality described herein. Apparatus 900 may comprise at least one processor 902. The at least one processor 902 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

Apparatus 900 may further comprise at least one memory 904. The memory 904 may be configured to store, for example, computer program code or the like, for example operating system software and application software. The memory 904 may comprise one or more volatile memory devices, one or more non-volatile memory devices, and/or a combination thereof. For example, the memory may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.). Memory 904 is provided as an example of a (non-transitory) computer readable medium. The term "non-transitory," as used herein, is a limitation of the medium itself (i.e., tangible, not a signal) as opposed to a limitation on data storage persistency (e.g., RAM vs. ROM).

Apparatus 900 may further comprise a communication interface 908 configured to enable apparatus 900 to transmit and/or receive information. The communication interface 908 may comprise an internal or external communication interface, or a radio interface. Apparatus 900 may further comprise other components and/or functions such as for example a user interface (not shown) comprising at least one input device and/or at least one output device. The input device may take various forms such a keyboard, a touch screen, or one or more embedded control buttons. The output device may for example comprise a display, a speaker, or the like.

When apparatus 900 is configured to implement some functionality, some component and/or components of apparatus 900, such as for example the at least one processor 902 and/or the at least one memory 904, may be configured to implement this functionality. Furthermore, when the at least one processor 902 is configured to implement some functionality, this functionality may be implemented using program code 906 comprised, for example, in the at least one memory 904.

The functionality described herein may be performed, at least in part, by one or more computer program product components such as software components. According to an example embodiment, apparatus 900 comprises a processor or processor circuitry, such as for example a microcontroller, configured by the program code 906, when executed, to execute the embodiments of the operations and functionality described herein. Program code 906 is provided as an example of instructions which, when executed by the at least one processor 902, cause performance of apparatus 900.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), graphics processing units (GPUs), or the like.

Apparatus 900 may be configured to perform, or cause performance of, method(s) described herein or comprise means for performing method(s) described herein. In one example, the means comprises the at least one processor 902, the at least one memory 904 including program code 906 configured to, when executed by the at least one processor 902, cause apparatus 900 to perform the method (s). In general, computer program instructions may be executed on means providing generic processing functions. Such means may be embedded for example in a personal computer, a smart phone, a network device, or the like. The method(s) may be thus computer-implemented, for example based algorithm(s) executable by the generic processing functions, an example of which is the at least one processor 902. The means may comprise transmission or reception means, for example one or more radio transmitters or receivers, which may be coupled or be configured to be coupled to one or more antennas, or transmitter(s) or receiver(s) of a wired communication interface. Although apparatus 900 is illustrated as a single device, it is appreciated that, wherever applicable, functions of apparatus 900 may be distributed to a plurality of devices.

Figure 10:
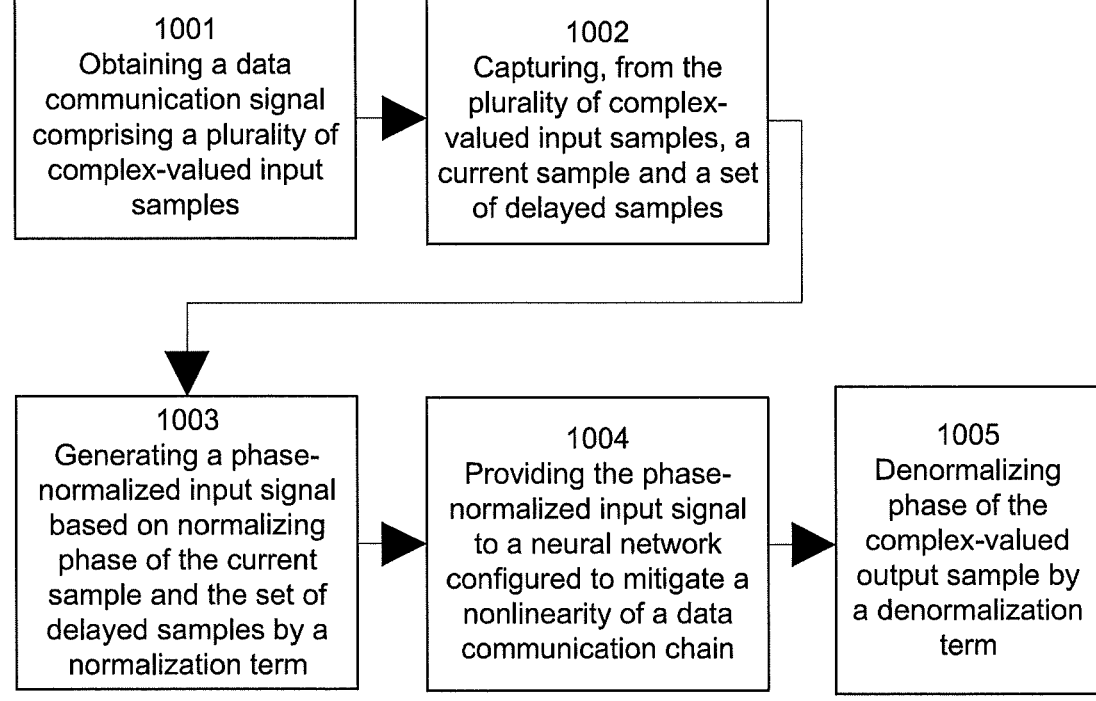
FIG. 10 illustrates an example of a method for mitigating non-linearity of a data communication chain.

FIG. 10 illustrated an example of a method for mitigating non-linearity of a data communication chain.

At 1001, the method may comprise obtaining a data communication signal (100) comprising a plurality of complex-valued input samples.

At 1002, the method may comprise capturing, from the plurality of complex-valued input samples, a current sample and a set of delayed samples.

At 1003, the method may comprise generating a phase-normalized input signal based on normalizing phase (201) of the current sample and the set of delayed samples by a normalization term, wherein the normalization term is common for the current sample and the set of delayed samples.

At 1004, the method may comprise providing the phase-normalized input signal to a neural network (202) configured to mitigate non-linearity of a data communication chain and to output a complex-valued output sample for each of the plurality of complex-valued input samples.

At 1005, the method may comprise denormalizing phase of the complex-valued output sample by a denormalization term configured to restore phase of the data communication signal.

The method may be performed an apparatus, for example by apparatus 900 based on program code 906, when executed by processor 902, or based on circuitry configured to perform the method, as described above. Various examples of the methods are explained above, for example with reference to FIGS. 1 to 6. It should be understood that example embodiments described may be combined in different ways unless explicitly disallowed.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the example embodiments described above may be combined with aspects of any of the other example embodiments described to form further example embodiments without losing the effect sought.

The term 'comprising' is used herein to mean including the method, blocks, or elements identified, but that such blocks or elements do not comprise an exclusive list and a method or apparatus may contain additional blocks or elements.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Although subjects may be referred to as 'first' or 'second' subjects, this does not necessarily indicate any order or importance of the subjects. Instead, such attributes may be used solely for the purpose of making a difference between subjects.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A method, comprising:

obtaining a data communication signal comprising a plurality of complex-valued input samples;

capturing, from the plurality of complex-valued input samples, a current sample and a set of delayed samples;

generating a phase-normalized input signal based on normalizing phase of the current sample and the set of delayed samples with a normalization term, wherein the normalization term is common for the current sample and the set of delayed samples;

providing the phase-normalized input signal to a neural network, the neural network configured to mitigate non-linearity of a data communication chain and to output a complex-valued output sample for the plurality of complex-valued input samples; and denormalizing phase of the complex-valued output sample with a denormalization term, the denormalization term configured to restore phase of the data communication signal;

wherein the normalizing phase is based on multiplication of the current sample and the delayed samples with the normalization term, wherein the denormalizing phase is based on multiplication of the complex-valued output sample with the denormalization term, and wherein the denormalization term comprises a complex conjugate of the normalization term.

2. The method of claim 1, wherein the neural network is a real-valued neural network.

3. The method of claim 1, wherein the normalization term is configured to normalize current samples of the plurality of complex-valued input samples to zero-phase.

4. The method of claim 1, wherein samples of the phase-normalized input signal are decomposed into two real-valued samples, wherein the two real-valued samples represent real and imaginary parts of the current sample or a delayed sample of the set of delayed samples.

5. The method of claim 1, further comprising:

providing, to the neural network, an augmented input comprising a second set of delayed samples comprising a p-th power of an absolute value of the set of delayed samples, where p is a non-zero integer.

6. The method of claim 1, wherein the neural network is configured to mitigate non-linearity of a radio frequency part of the data communication chain.

7. The method of claim 1, further comprising at least one of:

providing the data communication signal to a linear dynamic model configured to mitigate the non-linearity of the data communication chain parallel to the neural network; or providing the data communication signal to a non-linear dynamic model configured to mitigate the non-linearity of the data communication parallel to the neural network.

8. The method of claim 1, wherein the neural network is configured to mitigate a non-linearity of a radio frequency amplifier.

9. The method of claim 8, wherein the radio frequency amplifier is a power amplifier.

10. The method of claim 1, wherein the data communication signal comprises a baseband signal.

11. A non-transitory program storage device readable with an apparatus, tangibly embodying a program of instructions executable with the apparatus to perform the method according to claim 1.

12. An apparatus, comprising:

at least one processor; and at least one non-transitory memory configured to store instructions that, when executed with the at least one processor, cause the apparatus to perform:

obtaining a data communication signal comprising a plurality of complex-valued input samples;

capturing, from the plurality of complex-valued input samples, a current sample and a set of delayed samples;

generating a phase-normalized input signal based on normalizing phase of the current sample and the set of delayed samples with a normalization term, wherein the normalization term is common for the current sample and the set of delayed samples;

providing the phase-normalized input signal to a neural network, the neural network configured to mitigate non-linearity of a data communication chain and to output a complex-valued output sample for the plurality of complex-valued input samples; and denormalizing phase of the complex-valued output sample with a denormalization term, the denormalization term configured to restore phase of the data communication signal;

wherein the normalizing phase is based on multiplication of the current sample and the delayed samples with the normalization term, wherein the denormalizing phase is based on multiplication of the complex-valued output sample with the denormalization term, and wherein the denormalization term comprises a complex conjugate of the normalization term.

13. The apparatus according to claim 12, wherein the instructions when executed with the at least one processor, execute the method according to claim 2.

14. The apparatus of claim 12, wherein the apparatus comprises any of a transmitter, a receiver, a transceiver, a user equipment, or an access node.

* * * * *